B. B. SCHÄFER.
METAL VAPOR RECTIFIER.
APPLICATION FILED JULY 14, 1920.
1,369,984.
Patented Mar. 1, 1921.
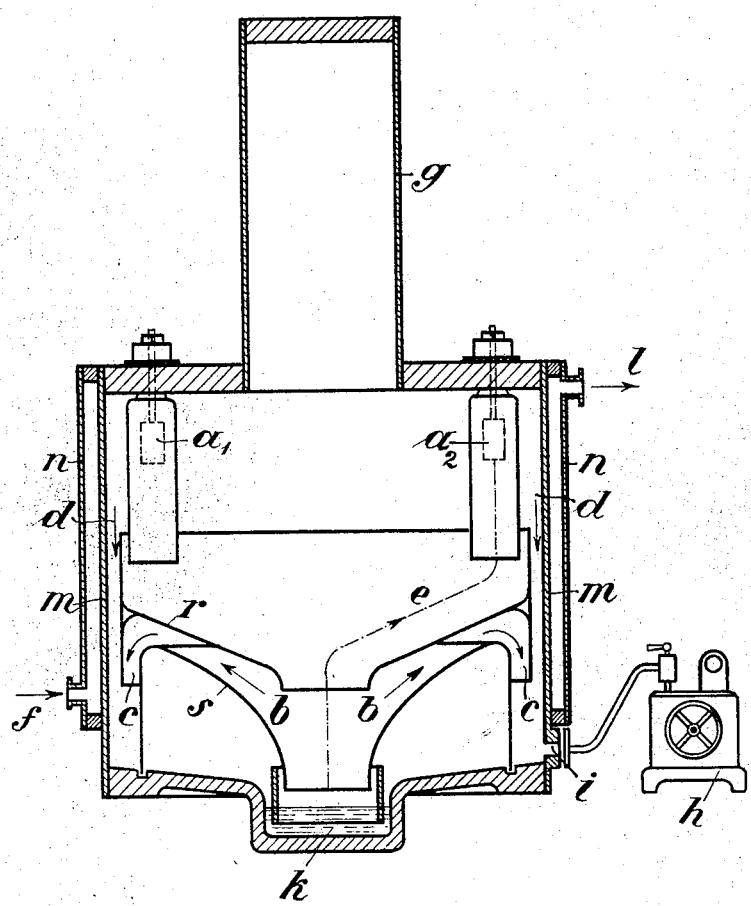
Inventor
B. B. Schäfer
By H. R. Kerslake
Atty.

UNITED STATES PATENT OFFICE.

BÉLA BENÖ SCHÄFER, OF BADEN, SWITZERLAND, ASSIGNOR TO GLEICHRICHTER-AKTIENGESELLSCHAFT, OF GLARUS, SWITZERLAND.

METAL VAPOR-RECTIFIER.

1,369,984.  Specification of Letters Patent.  Patented Mar. 1, 1921.

Application filed July 14, 1920. Serial No. 396,299.

*To all whom it may concern:*

Be it known that I, BÉLA BENÖ SCHÄFER, a citizen of the German Realm, residing at No. 39 Schartenstrasse, Baden, Switzerland, have invented certain new and useful Improvements in Metal Vapor-Rectifiers, of which the following is a specification.

It is known that in metal vapor rectifiers, it is an advantage to locate the connection of the vacuum duct to the working cylinder of the rectifier at the lowest possible point of the said cylinder.

The present invention has for its object to provide an improved construction of the working cylinder such that the desired increased suction shall be made as effective as possible. For this purpose funnel-shaped sheet metal walls are built-in as illustrated in the accompanying drawing. These walls cause the generated mercury vapor to flow off laterally toward the cooled walls of the vessel, and thereby they produce in the neighborhood of the wall of the vessel those conditions that are favorable for a powerful suction.

The drawing shows a convenient construction of apparatus according to the present invention.

In this drawing, $g$ is the metal vacuum vessel containing the anodes $a^1$ and $a^2$ and the cathode $k$. The arc between the electrodes passes approximately along the path indicated by the dot and dash line $e$. The funnel-shaped guide wall $r$ incloses all the stretches of vapor and conveys them to the cathode through a lower aperture located in the axis of the vessel.

The current of vapor rising from the cathode has a tendency to escape as quickly as possible in a lateral direction, and consequently follows the path indicated by the arrows $b$ and $c$ under the collector $r$, the sheet metal wall $s$ serving also as a guide surface. The mercury vapor which is condensed on the walls of the vessel produces in the lower part of the working cylinder a compression of the foreign gases which flow in along the direction indicated by the arrows $d$.

The air pump $h$ is connected at $i$ to the metal container where it draws off the compressed gases.

The chamber inclosed by the cylindrical double walls $m$ and $n$ is traversed by cooling water which enters at $f$ and passes out from the rectifier at $l$.

The improvement of the present invention is also applicable with advantage to all apparatuses whose operation depends on the vaporization of a metal electrode in a vacuum.

What I claim is:—

1. A metal vapor rectifier including an evacuated container with water cooled walls, an anode, a cathode, a funnel-shaped arc deflecting screen and a second funnel-shaped screen, said screens forming between them an annular space whose upper orifice is adjacent to the water cooled walls of the container and whose lower end is adjacent to the cathode surface.

2. A metal vapor rectifier including an evacuated container with water cooled walls, an anode, a cathode, a funnel-shaped arc deflecting screen the upper part of which is formed into a tube whose walls are adjacent to and approximately parallel to the vertical water cooled walls of the container, and a second funnel-shaped screen, said screens forming between them an annular space whose upper orifice is adjacent to the water cooled walls of the container and whose lower end is adjacent to the cathode surface.

3. A metal vapor rectifier including an evacuated container with water cooled walls, an anode, a cathode, a funnel-shaped arc deflecting screen and a second funnel-shaped screen, whose upper end is formed as a tube whose walls are adjacent to and approximately parallel to the vertical water cooled walls of said container, said screens forming between them an annular space whose upper orifice is adjacent to the water cooled walls of the container and whose lower end is adjacent to the cathode surface.

In testimony whereof I have signed my name to this specification.

BÉLA BENÖ SCHÄFER.